(12) United States Patent
Takemura et al.

(10) Patent No.: US 11,063,546 B2
(45) Date of Patent: Jul. 13, 2021

(54) MOTOR CONTROL DEVICE

(71) Applicant: OMRON Corporation, Kyoto (JP)

(72) Inventors: Sunao Takemura, Ibaraki (JP); Satoshi Miyagawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/641,685

(22) PCT Filed: Jan. 17, 2019

(86) PCT No.: PCT/JP2019/001346
§ 371 (c)(1),
(2) Date: Feb. 25, 2020

(87) PCT Pub. No.: WO2019/155844
PCT Pub. Date: Aug. 15, 2019

(65) Prior Publication Data
US 2020/0228043 A1 Jul. 16, 2020

(30) Foreign Application Priority Data

Feb. 9, 2018 (JP) .............................. JP2018-022424

(51) Int. Cl.
*H02P 27/08* (2006.01)
*H02M 7/5387* (2007.01)
(52) U.S. Cl.
CPC ........ *H02P 27/08* (2013.01); *H02M 7/53871* (2013.01); *H02P 2201/11* (2013.01)
(58) Field of Classification Search
None
See application file for complete search history.

(56) References Cited

U.S. PATENT DOCUMENTS

| 4,316,132 | A | * | 2/1982 | Geppert | .................. B60L 53/24 |
| | | | | | 318/723 |
| 4,546,422 | A | * | 10/1985 | Okado | .................. H02M 7/537 |
| | | | | | 318/811 |
| 5,345,260 | A | * | 9/1994 | Petralia | ................ H04N 5/2254 |
| | | | | | 348/98 |
| 6,014,497 | A | * | 1/2000 | Kerkman | .......... H02M 7/53875 |
| | | | | | 318/254.2 |

(Continued)

FOREIGN PATENT DOCUMENTS

| JP | H03-164071 A | 7/1991 |
| JP | 2004-153866 A | 5/2004 |
| JP | 2010-057242 A | 3/2010 |

OTHER PUBLICATIONS

An English translation of the International Search Report("ISR") of PCT/JP2019/001346 dated Feb. 26, 2019.

(Continued)

*Primary Examiner* — Bentsu Ro
(74) *Attorney, Agent, or Firm* — Metrolex IP Law Group, PLLC (57) ABSTRACT

The present invention easily inhibits an influence of a dead time on voltage control without requiring a user to consider a specific usage condition or the like of each motor control device. A control circuit (10) controls a step-down converter circuit (40) to step down a DC voltage to be applied to an inverter circuit (60) so that a duty of a PWM signal becomes greater than a dead time (Td).

2 Claims, 6 Drawing Sheets

(56) References Cited

U.S. PATENT DOCUMENTS

| | | | |
|---|---|---|---|
| 7,362,069 B2 * | 4/2008 | Yamamoto | H02M 7/53873 318/599 |
| 9,444,369 B2 * | 9/2016 | Suzuki | H02M 7/53875 |
| 2006/0125437 A1 | 6/2006 | Kitano | |

OTHER PUBLICATIONS

The Written Opinion("WO") of PCT/JP2019/001346 dated Feb. 26, 2019.

* cited by examiner

MOTOR CONTROL DEVICE

TECHNICAL FIELD

The present invention relates to a motor control device including an inverter circuit that drives a motor based on ON and OFF states of a switching element switched by a pulse width modulation (PWM) signal.

BACKGROUND ART

Conventionally, in a motor control device for controlling a motor by a PWM method, it is known that a dead time (on-delay) which is set for a PWM signal to prevent short circuit caused due to switching elements causes a voltage control error. For example, Patent Literature 1 discloses an inverter device which corrects a pulse width of a PWM waveform signal or sets a dead time in accordance with a magnitude of an inverter output current or with a phase of the output current, and thus inhibits an influence of the dead time.

CITATION LIST

Patent Literature

[Patent Literature 1]
Japanese Patent Application Publication Tokukaihei No. 3-164071 (Publication date: Jul. 16, 1991)

SUMMARY OF INVENTION

Technical Problem

However, the conventional technique as described above has the following problems. That is, in order to actually inhibit the influence of the dead time on the voltage control, individual study needs to be conducted in accordance with a specific usage condition of each motor control device. This is not necessarily easy for a user to realize.

That is, in the motor control device in accordance with the above conventional technique, it is necessary to specify a switching characteristic of the inverter circuit in order to calculate a necessary correction amount of the pulse width and a desirable dead time. Here, the switching characteristic is influenced by unevenness of component characteristics of components that actually constitute the circuit. Moreover, the switching characteristic is influenced by a cable connecting the motor control device with the motor (specifically, the switching characteristic is influenced by "a stray capacitance between the cable and ground" which depends on a wiring condition, self-inductance of the cable, and the like). Therefore, according to the conventional technique as described above, it is necessary to specify a switching characteristic in order to inhibit an influence of a dead time on voltage control. However, in order to specify a switching characteristic, it is necessary to individually consider a component characteristic, a cable, and the like. As such, it is not easy for the user to specify the switching characteristic.

An object of an aspect of the present invention is to provide a motor control device and the like that can easily inhibit an influence of a dead time on voltage control without requiring a user to consider a specific usage condition or the like of each motor control device.

Solution to Problem

In order to attain the object, a motor control device in accordance with an aspect of the present invention includes: an inverter circuit which drives a motor based on ON and OFF states of each of switching elements, the ON and OFF states being switched by a pulse width modulation (PWM) signal; and a control circuit which is connected to the inverter circuit via a signal line, the control circuit supplying the PWM signal to the inverter circuit, the control circuit controlling a voltage to be applied to the inverter circuit such that a duty of the PWM signal becomes greater than a dead time which is predetermined for preventing short circuit caused due to the switching elements.

Advantageous Effects of Invention

An aspect of the present invention brings about an effect of easily inhibiting an influence of a dead time on voltage control without requiring a user to consider a specific usage condition or the like of each motor control device.

DESCRIPTION OF EMBODIMENTS

Embodiment 1

The following description will discuss an embodiment (hereinafter, also referred to as "the present embodiment") in accordance with one aspect of the present invention with reference to FIGS. 1 through 7. In the drawings, the same or corresponding portions are denoted by the same reference numerals, and descriptions thereof will not be repeated. In the present embodiment, for example, a servo driver 1 for controlling driving of a servomotor 2 is described as a typical example of a motor control device. In order to facilitate an understanding of the servo driver 1 in accordance with an aspect of the present invention, an outline of a motor control system Sys including the servo driver 1 will first be described with reference to FIG. 2.

§ 1. Application Example

Figure 2:
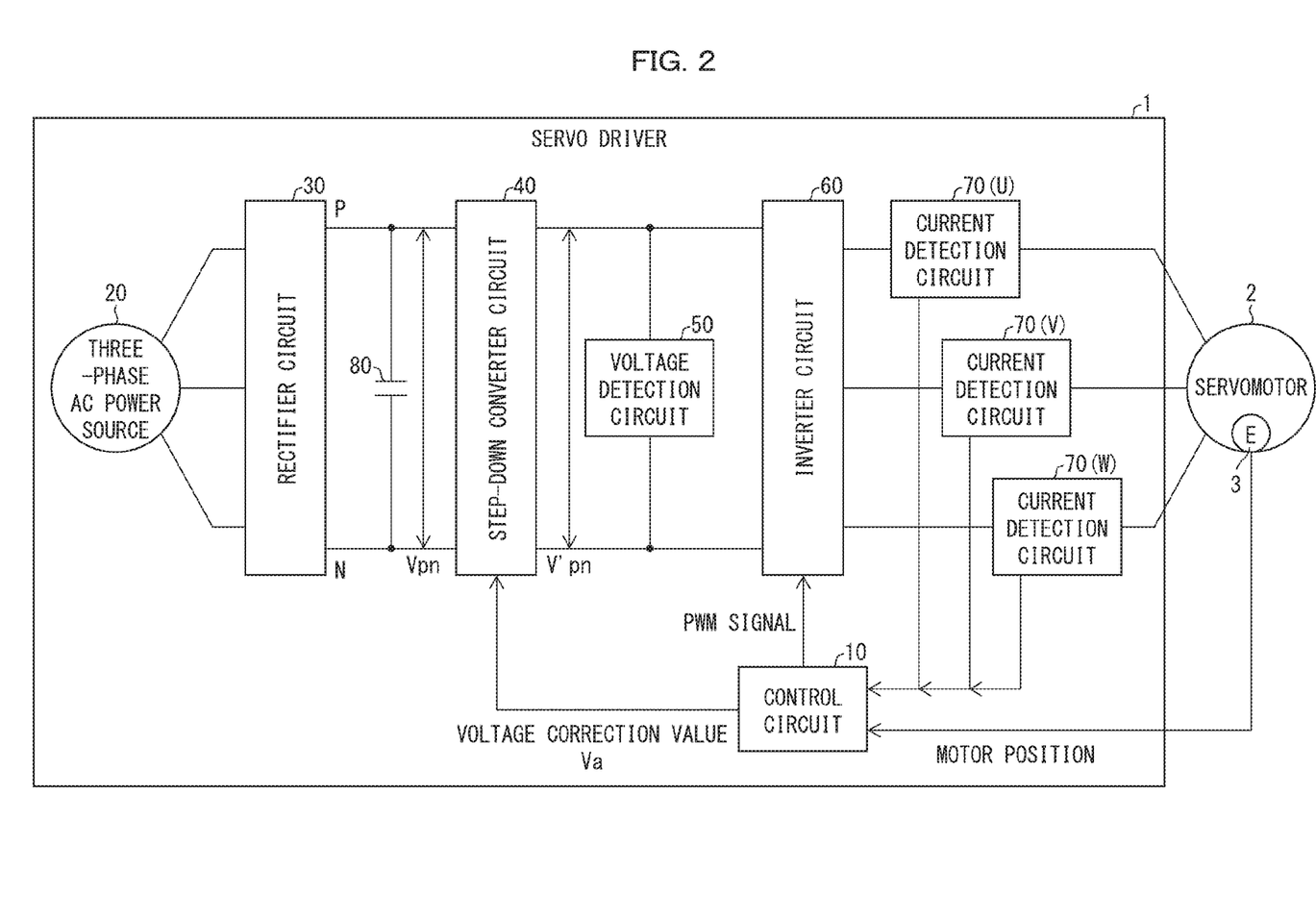
FIG. 2 is a diagram illustrating an overview of a motor control system including the servo driver in accordance with Embodiment 1 of the present invention.

FIG. 2 is a diagram illustrating an overview of the motor control system Sys including the servo driver 1. As illustrated in FIG. 2, the motor control system Sys includes the servo driver 1, the servomotor 2, and an encoder 3. The motor control system Sys can further include a host controller and a tool which are not illustrated.

In the motor control system Sys, the servo driver 1 and the servomotor 2 are connected to each other with a dedicated cable. The servo driver 1 is a motor control device for controlling driving of the servomotor 2. The servomotor 2 is, for example, a three-phase electric motor. The encoder 3 is connected to the servo driver 1 via a signal line. The encoder 3 detects a position (motor position) of the servomotor 2 and supplies the detected motor position to the servo driver 1.

The servo driver 1 determines an amount of operation of the servomotor 2 based on, for example, a difference (deviation) between (i) "a command value (motor driving command) for controlling the servomotor 2" received from the host device or the tool which are not illustrated and (ii) feedback information such as the motor position received from the encoder 3. The servo driver 1 illustrated in FIG. 2 includes (i) an inverter circuit 60 for converting a direct current into an alternating current, (ii) a control circuit 10 for generating a pulse width modulation (PWM) signal (motor driving signal) for driving the inverter circuit 60, and (iii) a step-down converter circuit 40.

Figure 4:
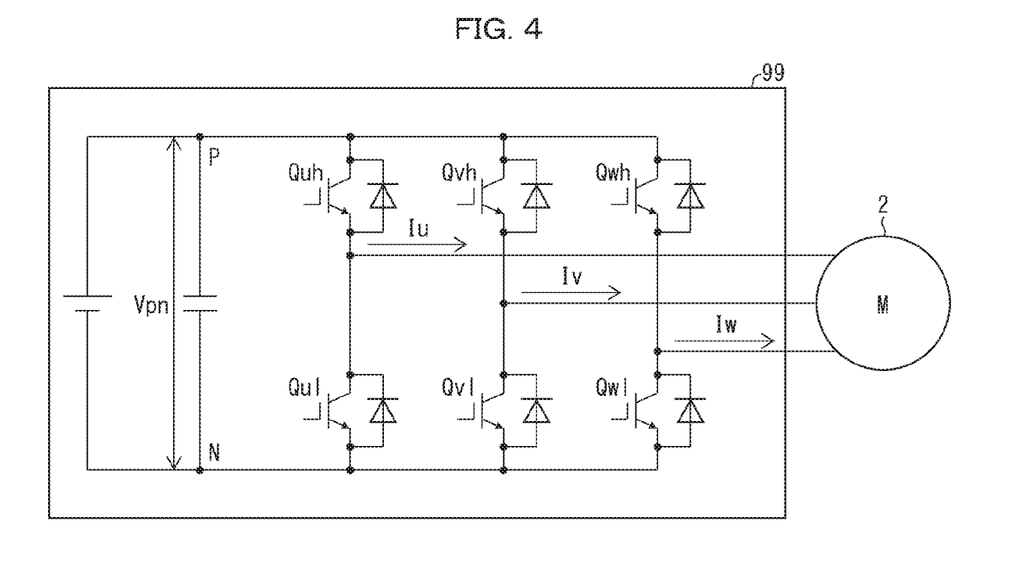
FIG. 4 is a diagram for explaining an outline of a conventional motor control device that does not include a step-down converter circuit.

FIG. 4 is a diagram for explaining an outline of a conventional motor control device 99 that does not include a step-down converter circuit. In order to facilitate an understanding of the servo driver 1, an outline of the conventional motor control device 99 will first be described. The servo driver 1 includes the step-down converter circuit 40, whereas the conventional motor control device 99 does not include the step-down converter circuit (details will be described later).

The conventional motor control device 99 illustrated in FIG. 4 has three pairs of switching elements respectively corresponding to a U-phase, a V-phase, and a W-phase of the servomotor 2. Specifically, the conventional motor control device 99 includes "a U-phase high-side switching element Quh and a U-phase low-side switching element Qul" which correspond to the U-phase of the servomotor 2. Moreover, the conventional motor control device 99 includes "a V-phase high-side switching element Qvh and a V-phase low-side switching element Qvl" which correspond to the V-phase and "a W-phase high-side switching element Qwh and a W-phase low-side switching element Qwl" which correspond to the W-phase.

The conventional motor control device 99 switches between the high-side switching element (Quh, Qvh, Qwh) and the low-side switching element (Qul, Qvl, Qwl) corresponding to each phase of the servomotor 2, and thus drives the servomotor 2. That is, the conventional motor control device 99 switches between ON and OFF states of "the U-phase high-side switching element Quh and the U-phase low-side switching element Qul" and thus controls an electric current Iu flowing to the U-phase of the servomotor 2. The conventional motor control device 99 switches between ON and OFF states of "the V-phase high-side switching element Qvh and the V-phase low-side switching element Qvl" and thus controls an electric current Iv flowing to the V-phase of the servomotor 2. The conventional motor control device 99 switches between ON and OFF states of "the W-phase high-side switching element Qwh and the W-phase low-side switching element Qwl" and thus controls an electric current Iw flowing to the W-phase of the servomotor 2.

Similarly, the inverter circuit 60 of the servo driver 1 switches between the high-side switching element and the low-side switching element corresponding to each phase of the servomotor 2 based on a PWM signal supplied from the control circuit 10. Thus, the inverter circuit 60 drives the servomotor 2.

Note that, in the following descriptions, the high-side switching element is also referred to as a higher potential switching element. The low-side switching element is also referred to as a lower potential switching element.

Figure 5:
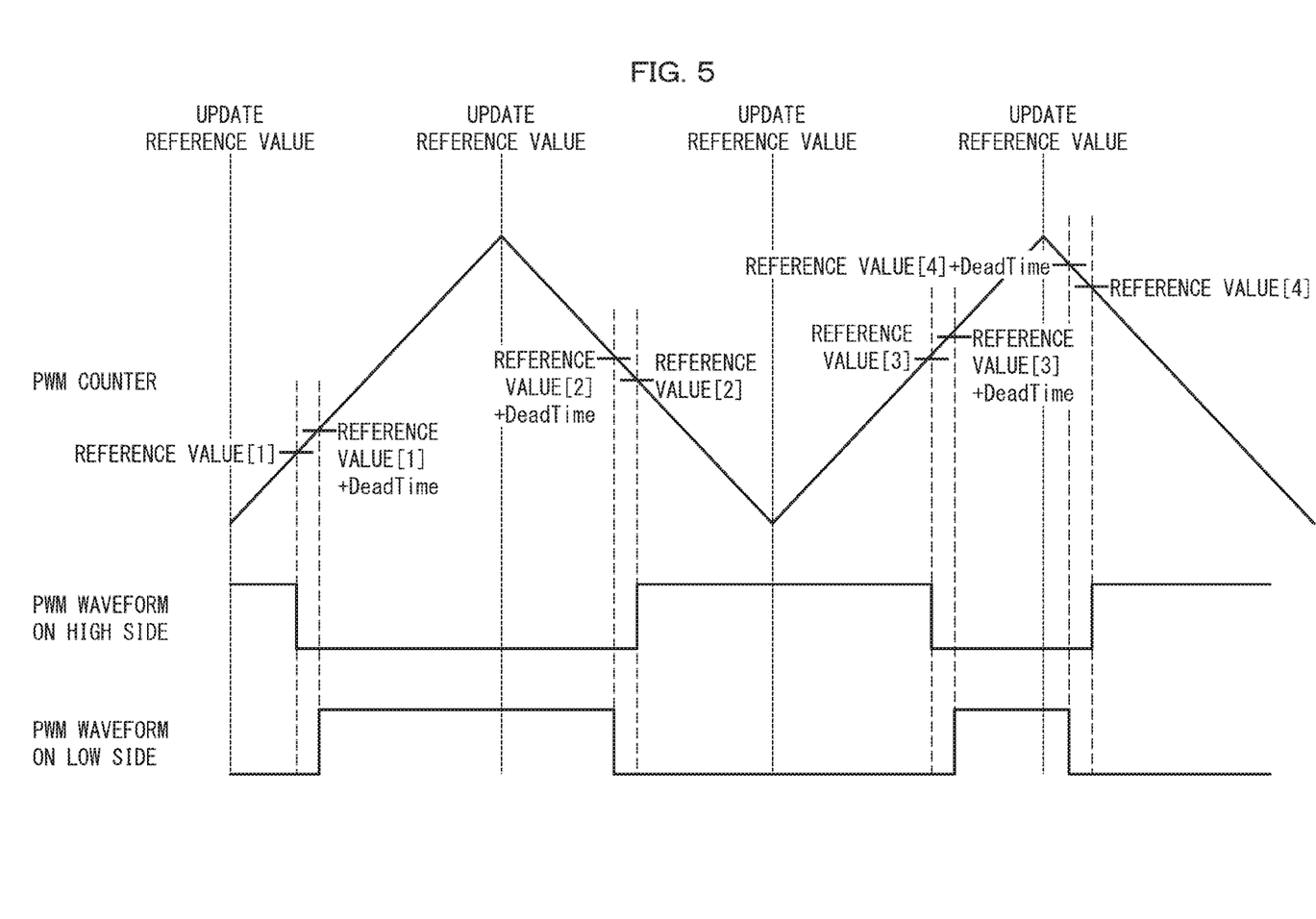
FIG. 5 is a diagram for explaining a dead time set for protecting an inverter circuit.
Figure 6:
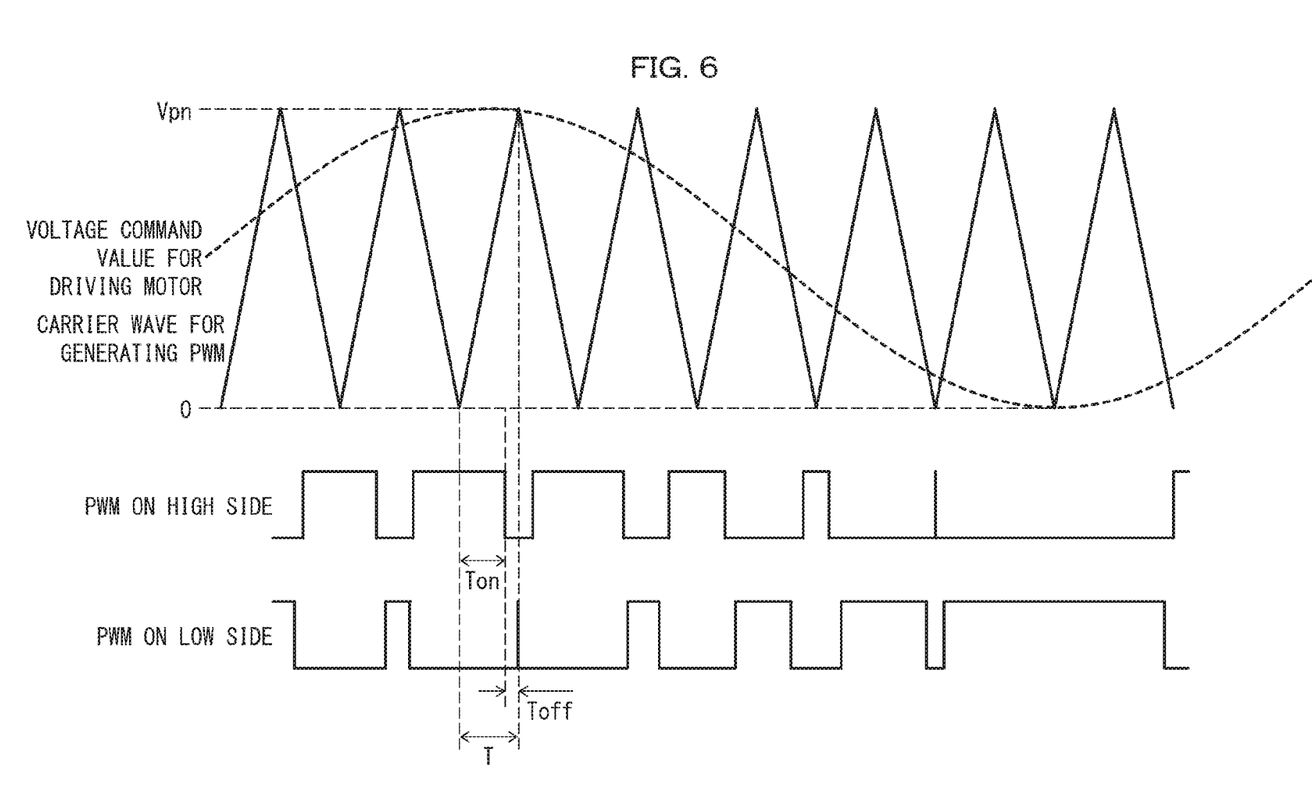
FIG. 6 is a diagram for explaining an influence of a dead time on voltage control.
Figure 7:
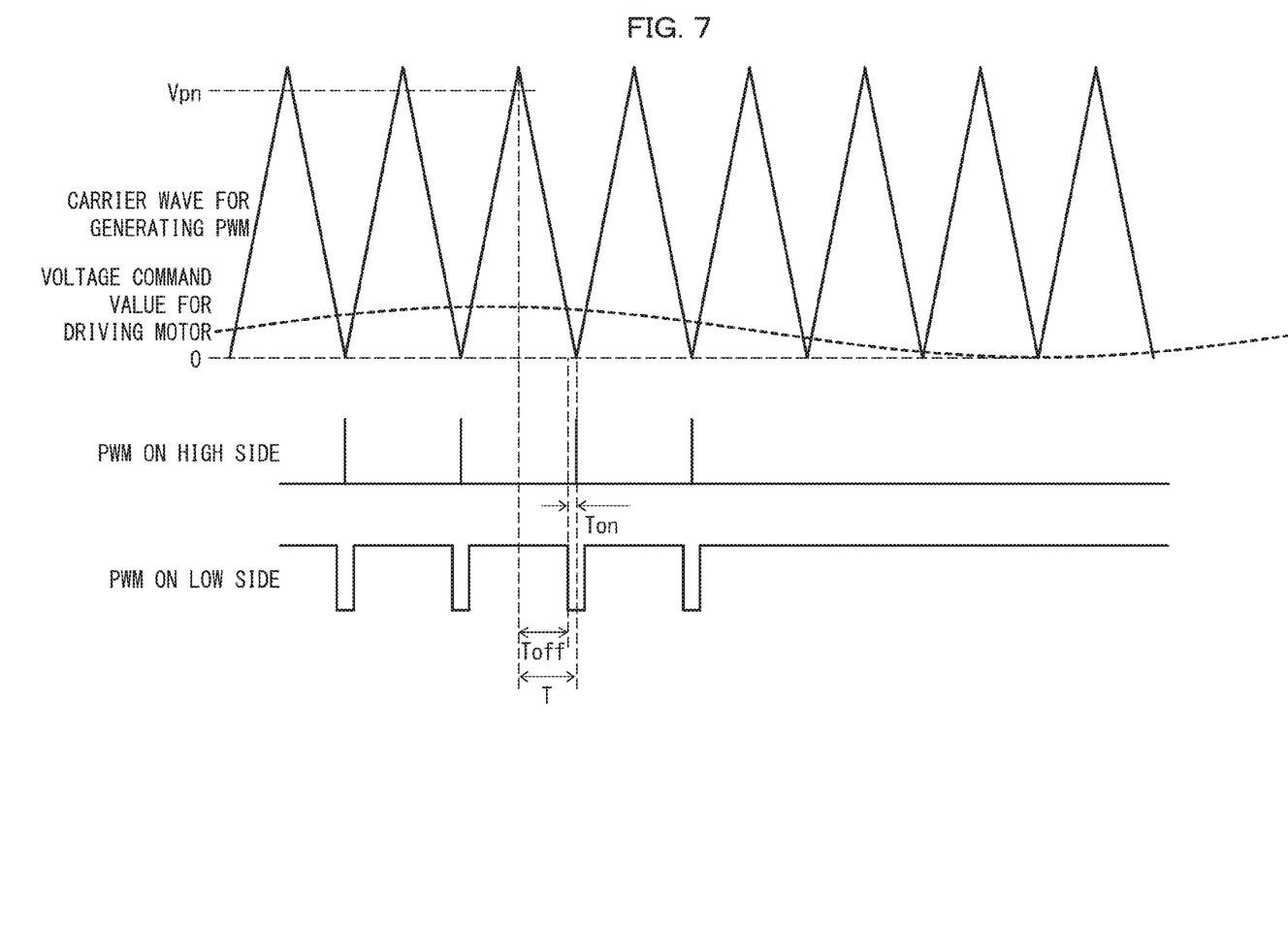
FIG. 7 is another diagram (other than FIG. 6) for explaining an influence of a dead time on voltage control.

FIG. 5 is a diagram for explaining a dead time set for protecting an inverter circuit. In FIG. 5, FIG. 6, and FIG. 7, "HIGH-SIDE PWM" indicates a PWM signal given to the high-side switching element. Moreover, "LOW-SIDE PWM" indicates a PWM signal given to the low-side switching element. Moreover, "PWM waveform" indicates ON and OFF states in the PWM signal.

As illustrated in FIG. 5, for each predetermined point in time realized by a PWM counter, a reference value (threshold value) corresponding to a duty indication value is set (updated) for a voltage level of a carrier signal. The carrier signal is binarized while setting a part in which the voltage level of the carrier signal is not lower than the threshold value as "H" (High), and setting a part in which the voltage level of the carrier signal is lower than the threshold value as "L" (Low). Thus, a PWM signal having a duty corresponding to the duty indication value (reference value) is obtained.

Each of FIG. 6 and FIG. 7 is a diagram for explaining an influence of a dead time Td on voltage control in typical PWM modulation (details will be described later). Note, however, that it is not essential for the servo driver 1 to employ the PWM modulation, and the servo driver 1 can employ modulation carried out by an SV-PWM method.

For each of the conventional motor control device 99 and the servo driver 1, a dead time Td for protecting the inverter circuit (inverter circuit 60) is set as illustrated in FIG. 5. The "dead time", which is a period during which both "the high-side switching element and the low-side switching element" of each phase are turned off, is also called "on-delay". During this period, occurrence of short circuit is prevented, which may be caused when both the high-side switching element and the low-side switching element are turned on.

However, the dead time Td is known to have a problem of causing distortion of a voltage to be supplied from the inverter circuit 60 to the servomotor 2. That is, an actual voltage (i.e., a voltage to be supplied from the inverter circuit 60 to the servomotor 2) in the dead time Td changes in accordance with the direction and magnitude of an electric current (i.e., an electric current flowing between the inverter circuit 60 and the servomotor 2). Therefore, the inverter circuit 60 cannot supply a desired voltage (command voltage Vout) to the servomotor 2 in accordance with a command given from the control circuit 10, i.e., in accordance with a PWM signal outputted by the control circuit 10.

The servo driver 1 then uses the step-down converter circuit 40 to drop a DC voltage to be supplied to the inverter circuit 60. This allows the servo driver 1 to reduce a ratio of the dead time Td with respect to a duration of ON state (duty Ton) in the PWM signal even at low output power. Thus, the servo driver 1 can inhibit an influence of the dead time Td, and thereby can achieve electric current control with higher responsiveness even at a low current.

In general, in a case where a DC voltage to be supplied to the inverter circuit 60 is constant, a modulation ratio becomes lower at a low revolution and a low load. That is, the duty Ton is reduced. Therefore, an influence from the dead time Td becomes larger on the voltage to be supplied to the servomotor 2. In view of this, the servo driver 1 raises the modulation ratio, i.e., increase the duty Ton at a low revolution and a low load by dropping the DC voltage to be supplied (i.e., applied) to the inverter circuit 60. Thus, the servo driver 1 reduces an influence from the dead time Td on the voltage to be supplied from the inverter circuit 60 to the servomotor 2 even at a low revolution and a low load.

That is, the servo driver 1 uses the step-down converter circuit 40 to drop an input voltage to be supplied to the inverter circuit 60. According to the configuration, the servo driver 1 reduces a ratio of the dead time Td with respect to the duty Ton in the PWM signal even at low power (i.e., at a low revolution and a low load). Therefore, the servo driver 1 can inhibit an influence from the dead time Td, and thereby can achieve electric current control with higher responsiveness even at a low current (i.e., low power). In other words, the servo driver 1 achieves an improved low current characteristic during the motor control, and improves an electric current control response performance with respect to a frequency band.

In addition, the user can improve current response performance at a low current by the servo driver 1. That is, high-speed and high-precision control can be achieved even at a low load. This enables the user to achieve an application with high control performance in a wide load range from a low load to a high load.

As described above, the servo driver 1 includes, in addition to the inverter circuit 60 and the control circuit 10, the step-down converter circuit 40 for stepping down the voltage of the DC power to be supplied to the inverter circuit 60. According to this configuration, in a case where the servo driver 1 controls the inverter circuit 60 to supply an intended electric power to the servomotor 2, the voltage to be applied to the inverter circuit 60 is dropped by the step-down converter circuit 40, and thus the servo driver 1 causes the duty Ton in the PWM signal to become greater than the dead time Td.

§ 2. Configuration Example (Overview of Whole System Configuration)

The servo driver 1, which is a control device for the servomotor 2, accepts "a command value (motor driving command) for controlling the servomotor 2" from, for example, the host controller or the tool (not illustrated). The servo driver 1 accepts a feedback value such as a motor position from, for example, the encoder 3 (position sensor). The servo driver 1 adjusts electric power (voltage) for driving the servomotor 2 so that the feedback value approaches the motor driving command.

Example 1: Motor Driving Command from Host Controller

For example, the host device (not illustrated) is connected to the servo driver 1 via a field network. The host controller is, for example, an industrial control device such as a programmable logic controller (hereinafter abbreviated as "PLC"). The host controller executes a user program for controlling a control device such as the servomotor 2. In the motor control system Sys, the host controller is called "master device" because the host controller manages data transmission carried out via the field network. Meanwhile, the servo driver 1 can be called "slave device". That is, the motor control system Sys can be a master-slave control system including (i) the host controller as a master device and (ii) the servo driver 1 as one or more slave devices connected to the master device via the field network.

Through the field network, various kinds of data are transmitted which have been sent and received between the servo driver 1 and the host controller. That is, through the field network, various kinds of data are transmitted which are received by the host controller or sent by the host controller. As the field network, typically, various types of industrial Ethernet (registered trademark) can be used. As the industrial Ethernet (registered trademark), for example, EtherCAT (registered trademark), Profinet IRT, MECHATROLINK (registered trademark)-III, Powerlink, SERCOS (registered trademark)-III, CIP Motion, and the like are known, and any of these can be employed.

The servo driver 1 receives, for example, a motor driving command (i.e., a control instruction as a result of executing the user program by the host controller) from the host controller via the field network. The servo driver 1 can then drive the servomotor 2 in accordance with the control instruction received from the host controller via the field network. For example, the servo driver 1 receives motor driving commands such as a position command value, a speed command value, and a torque command value from the host controller at regular intervals.

The servo driver 1 obtains actual measured values relating to motion of the servomotor 2 from detectors such as the encoder 3, a current detector, and a torque sensor, which are connected to a shaft of the servomotor 2. The actual measured values accordingly include a position, a speed (typically calculated from a difference between a current position and a previous position) and a torque. The servo driver 1 can carry out feedback control while setting a motor driving command (e.g., a motor driving command from the host controller) to a target value and setting the actual measured value as a feedback value. That is, the servo driver 1 adjusts electric power (voltage) for driving the servomotor 2 so that the actual measured value approaches the target value. Note that the servo driver 1 is sometimes referred to as a servomotor amplifier.

Example 2: Motor Driving Command from Tool

A tool can be connected to the servo driver 1 via a communication cable, e.g., a universal serial bus (USB) cable. The tool is an information processing device for setting and adjusting various parameters (in particular, control parameters stored in the servo driver 1) in the motor control system Sys. Moreover, the tool can accept a user operation for controlling the driving of the servomotor 2 and the like.

The servo driver 1 stores the control parameters set and adjusted by the tool and drives the servomotor 2 in accordance with the control parameters. The servo driver 1 can drive the servomotor 2 in accordance with also a motor driving command corresponding to the user operation accepted by the tool. The servo driver 1 adjusts electric power (voltage) for driving the servomotor 2 so that a feedback value, such as a motor position, received from the encoder 3 approaches the motor driving command received from the tool.

(Overview of Servo Driver Configuration)

The servo driver 1 outlined above will now be described in greater detail. In order to facilitate an understanding of the servo driver 1, the servo driver 1 is outlined as follows.

The servo driver 1 (motor control device) is a motor control device including the inverter circuit 60 that "drives the servomotor 2 (motor) based on ON and OFF states of a switching element switched by a PWM signal". The servo driver 1 includes a control circuit 10 "which connects to the inverter circuit 60 via the signal line and supplies a PWM signal to the inverter circuit 60". The control circuit 10 controls a voltage (DC voltage V'pn) applied to the inverter circuit 60 such that a duty Ton of the PWM signal becomes greater than a predetermined dead time Td for preventing short circuit caused due to the switching elements in the inverter circuit 60.

According to the above configuration, the servo driver 1 controls the DC voltage V'pn applied to the inverter circuit 60 such that the duty Ton of the PWM signal becomes greater (longer) than the dead time Td.

Here, in a case where a voltage (command voltage Vout) to be supplied from the inverter circuit 60 to the servomotor 2 is constant, the duty Ton of the PWM signal can be controlled by controlling the DC voltage V'pn applied to the inverter circuit 60. That is, by controlling the DC voltage V'pn applied to the inverter circuit 60, the servo driver 1 controls the duty Ton of the PWM signal independently of a switching characteristic of the switching element, and thus can inhibit an influence of the dead time Td on the PWM signal.

As such, the servo driver 1 brings about an effect of easily inhibiting an influence of a dead time Td on voltage control without requiring a user to consider a specific usage condition or the like of each motor control device.

The servo driver 1 further includes the step-down converter circuit 40 "which is connected to the control circuit 10 via the signal line, which is connected to the inverter circuit 60 via a power feed line, and which thus applies a DC voltage V'pn to the inverter circuit 60". In the servo driver 1, the control circuit 10 (i) calculates a command voltage Vout which is a voltage to be applied from the inverter circuit 60 to the servomotor 2 and (ii) controls the step-down converter circuit 40 to step down, in accordance with the command voltage Vout, the voltage to be applied to the inverter circuit 60.

According to the above configuration, the servo driver 1 includes the step-down converter circuit 40 for applying a DC voltage V'pn to the inverter circuit 60. The servo driver 1 calculates a command voltage Vout which is a voltage to be applied to the servomotor 2, and causes the step-down converter circuit 40 to step down the voltage applied to the inverter circuit 60 in accordance with the calculated command voltage Vout.

In a case where the voltage applied to the inverter circuit 60 is constant, the duty Ton of the PWM signal decreases as the command voltage Vout becomes lower. That is, the duty Ton of the PWM signal is proportional to the command voltage Vout.

In a case where the command voltage Vout which is to be supplied from the inverter circuit 60 to the servomotor 2 is constant, the duty Ton of the PWM signal can be increased (extended) by stepping down a DC voltage applied to the inverter circuit 60.

That is, the servo driver 1 causes the step-down converter circuit 40 to step down, in accordance with the command voltage Vout, the voltage to be applied to the inverter circuit 60, and this makes it possible to set the duty Ton of the PWM signal to be greater (longer) than a dead time Td.

As such, the servo driver 1 brings about an effect of easily inhibiting, with the step-down converter circuit 40, an influence of a dead time Td on voltage control without requiring a user to consider a specific usage condition or the like of each motor control device.

In the servo driver 1, in a case where the command voltage Vout is equal to or lower than the threshold voltage Vth (predetermined value), the control circuit 10 controls the step-down converter circuit 40 to step down, in accordance with the command voltage Vout, the voltage to be applied to the inverter circuit 60.

According to the above configuration, the servo driver 1 steps down the voltage to be applied to the inverter circuit 60 in a case where the command voltage Vout is equal to or lower than the threshold voltage Vth.

As above described, in a case where the voltage applied to the inverter circuit 60 is constant, the duty Ton of the PWM signal decreases as the command voltage Vout becomes lower. That is, in a case where the voltage applied to the inverter circuit 60 is constant and the command voltage Vout is equal to or lower than the threshold voltage Vth, the duty Ton of the PWM signal becomes equal to or shorter than the dead time Td.

As such, in a case where the command voltage Vout is equal to or lower than the threshold voltage Vth, the servo driver 1 controls the step-down converter circuit 40 to step down, in accordance with the command voltage Vout, the voltage to be applied to the inverter circuit 60 in order to prevent the duty Ton of the PWM signal from becoming equal to or shorter than the dead time Td.

In a case where the command voltage Vout is equal to or lower than the threshold voltage Vth and the dead time Td can influence voltage control, the servo driver 1 steps down the voltage to be applied to the inverter circuit 60 and can thus inhibit the influence.

(Specific configuration of servo driver) The servo driver 1 illustrated in FIG. 2 includes a control circuit 10, a three-phase AC power source 20, a rectifier circuit 30, a step-down converter circuit 40, a voltage detection circuit 50, an inverter circuit 60, a current detection circuit 70, and a capacitor 80.

The three-phase AC power source 20 outputs AC power and is connected to the rectifier circuit 30 via a power feed line. The rectifier circuit 30 rectifies an alternating current received from an AC power source (e.g., the three-phase AC power source 20) and supplies a direct current to the step-down converter circuit 40 connected to the rectifier circuit 30 via the power feed line.

The capacitor 80 can be inserted between the rectifier circuit 30 and the step-down converter circuit 40 as illustrated in FIG. 2. In FIG. 2, a positive electrode terminal of the capacitor 80 is electrically connected between a positive side output terminal of the rectifier circuit 30 and a positive side of the step-down converter circuit 40. Moreover, a negative electrode terminal of the capacitor 80 is electrically connected between a negative side output terminal of the rectifier circuit 30 and a negative side of the step-down converter circuit 40. The capacitor 80 smoothes a direct current outputted from the rectifier circuit 30. The direct current which has been outputted from the rectifier circuit 30 and smoothed by the capacitor 80 is supplied to the inverter circuit 60 via the step-down converter circuit 40. The DC voltage supplied from the rectifier circuit 30 to the step-down converter circuit 40 via the capacitor 80 is referred to as "Vpn".

The step-down converter circuit 40 is connected to the inverter circuit 60 via the power feed line and to the control circuit 10 via the signal line. In FIG. 2, the positive side output terminal of the step-down converter circuit 40 is electrically connected to the positive side of the inverter circuit 60, and the negative side output terminal of the step-down converter circuit 40 is electrically connected to the negative side of the inverter circuit 60. The step-down converter circuit 40 obtains the DC voltage V'pn by stepping down the DC voltage Vpn, which has been outputted from the rectifier circuit 30, in accordance with an instruction (voltage correction value Va) given from the control circuit 10 (in particular, step-down value calculating section 104). The step-down converter circuit then supplies (applies) the DC voltage V'pn to the inverter circuit 60. That is, the AC power outputted by the three-phase AC power source 20 is rectified by the rectifier circuit 30, the voltage thereof is adjusted to an intended value (DC voltage V'pn) by the step-down converter circuit 40, and then the AC power is supplied to the inverter circuit 60.

The voltage detection circuit 50 detects a voltage V'pn (voltage value) of the DC power supplied from the step-down converter circuit 40 to the inverter circuit 60. That is, the voltage detection circuit 50 detects the DC voltage V'pn applied to the inverter circuit 60 and supplies the detected voltage V'pn to the control circuit 10. The voltage detection circuit 50 is, for example, electrically connected to the power feed line extending from the step-down converter circuit 40 to the inverter circuit 60, and is also connected to the control circuit 10 via the signal line.

The inverter circuit 60 converts the DC voltage V'pn (main circuit electric power, main circuit power source) supplied from the step-down converter circuit 40 into a three-phase alternating current (motor driving power, motor driving power source) by PWM control and supplies the three-phase alternating current to the servomotor 2. The inverter circuit 60 is also called "power circuit" or "main circuit" and supplies, to the servomotor 2, an electric current (electric power) for driving the servomotor 2.

In FIG. 2, the inverter circuit 60 is connected to the step-down converter circuit 40 via the power feed line and is supplied with the DC power from the step-down converter circuit 40. The inverter circuit 60 is connected to the control circuit 10 via the signal line and is supplied with a PWM signal from the control circuit 10.

The inverter circuit 60 drives the servomotor 2 by turning the switching element on and off. That is, the inverter circuit 60 typically includes three pairs of switching elements respectively corresponding to a U-phase, a V-phase, and a W-phase of the servomotor 2. In the inverter circuit 60, the switching element pair corresponding to the U-phase of the servomotor 2 is constituted by a U-phase high-side switching element Quh and a U-phase low-side switching element Qul which are connected in series. The switching element pair corresponding to the V-phase is constituted by a V-phase high-side switching element Qvh and a V-phase low-side switching element Qvl which are connected in series. The switching element pair corresponding to the W-phase is constituted by a W-phase high-side switching element Qwh and a W-phase low-side switching element Qwl which are connected in series. Connecting points between the higher potential switching elements Quh, Qvh, and Qwh and the lower potential switching elements Qul, Qvl, and Qwl are connected to the respective phases U, V, and W of the servomotor 2.

The inverter circuit 60 switches between the high-side switching element (Quh, Qvh, Qwh) and the low-side switching element (Qul, Qvl, Qwl) based on a PWM signal supplied from the control circuit 10, and thus drives the servomotor 2. In other words, the inverter circuit 60 carries out PWM control on "the voltage V'pn applied to the inverter circuit 60" with use of the PWM signal supplied from the control circuit 10. Then, the inverter circuit 60 supplies (applies) "the command voltage Vout calculated by the output voltage calculating section 103" to the servomotor 2.

Each of the switching elements (Quh, Qvh, Qwh, Qul, Qvl, and Qwl) of the inverter circuit 60 carries out an ON/OFF operation in accordance with a PWM signal supplied from a PWM signal generating section 105. Specifically, the high-side switching element and the low-side switching element are alternately turned on and off based on the PWM signal while the phases are offset from each other by 120°. From this, the DC voltage V'pn outputted from the step-down converter circuit 40 is converted into a three-phase AC voltage having the U-phase, the V-phase, the W-phase (specifically, the command voltage Vout) and is then supplied to the servomotor 2. The servomotor 2 is rotated by this three-phase AC voltage. In accordance with ON/OFF patterns of the switching elements (Quh, Qvh, Qwh, Qul, Qvl, and Qwl) according to the duty Ton of the PWM signal, a magnitude and a direction of the electric current flowing through the servomotor 2 are controlled.

The current detection circuit 70 detects an electric current (current value) of electric power supplied from the inverter circuit 60 to the servomotor 2. In particular, the current detection circuit 70 detects electric currents (detection phase current values Iu, Iv, and Iw) of the respective phases of the servomotor 2 flowing via the inverter circuit 60. The current detection circuit 70 supplies the detection phase current values Iu, Iv, and Iw thus detected to the control circuit 10 connected via the signal line.

The control circuit 10 is constituted by, for example, a microcomputer including CPU and a memory, and controls the inverter circuit 60 by using a PWM signal so that a control quantity of the servomotor 2 follows a motor driving command. The control circuit 10 controls driving of the servomotor 2 by supplying a PWM signal to the inverter circuit 60 for causing the inverter circuit 60 to supply electric power to the servomotor 2 in accordance with the PWM signal.

The control circuit 10 outputs a PWM signal for driving the servomotor 2 based on a motor driving command received from the host device or tool (not illustrated) and on a motor position (feedback value) given from the encoder 3. The following description will discuss details of the control circuit 10 with reference to FIG. 1 and the like.

(Configuration of Control Circuit)

Figure 1:
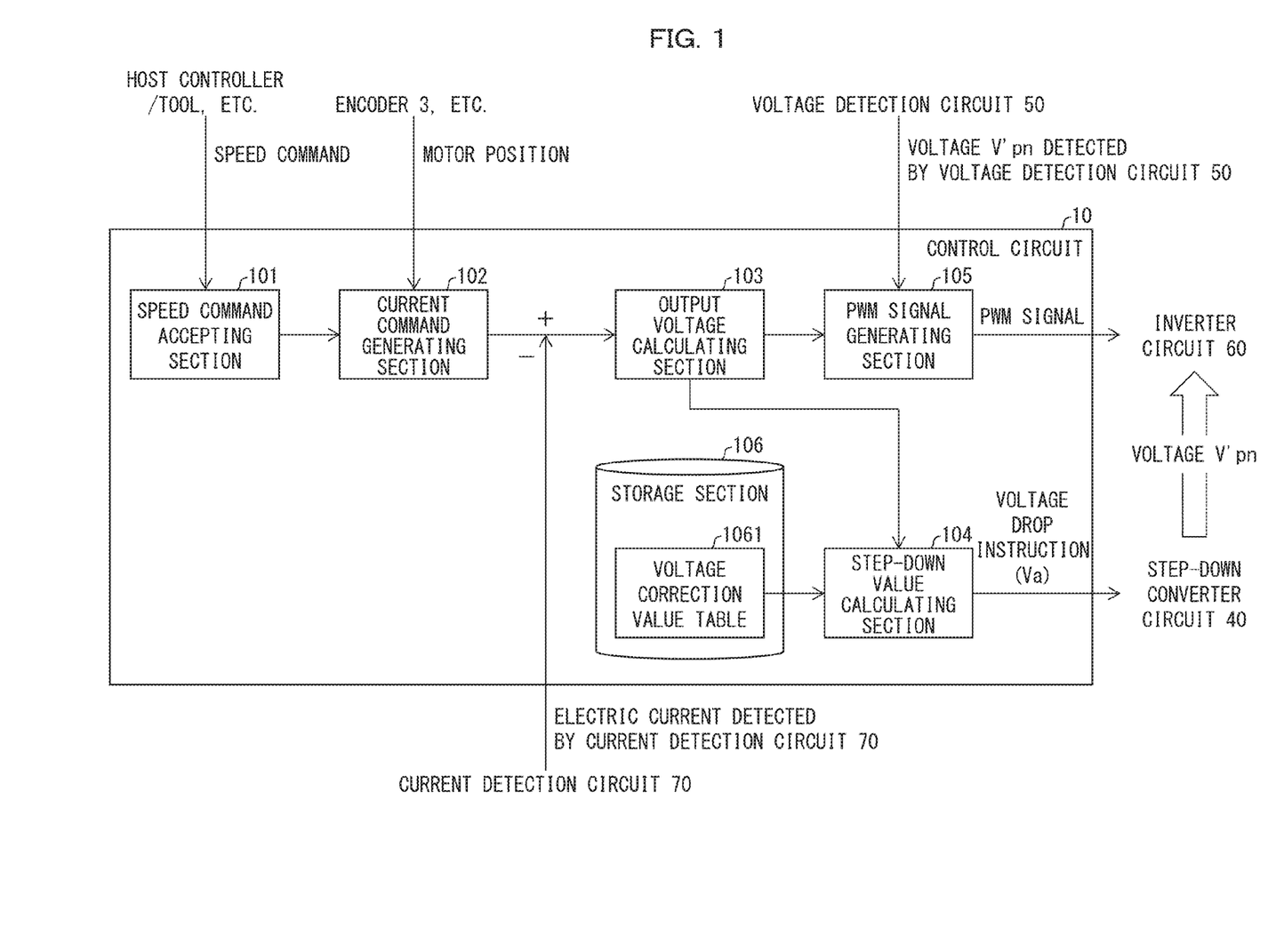
FIG. 1 is a block diagram illustrating a configuration of main parts such as a control circuit of a servo driver in accordance with Embodiment 1 of the present invention.

FIG. 1 is a block diagram illustrating a configuration of main parts such as the control circuit 10 of the servo driver 1. A speed command accepting section 101, a current command generating section 102, an output voltage calculating section 103, a step-down value calculating section 104, and a PWM signal generating section 105 illustrated in FIG. 1 can be realized when, for example, a processor (central processing unit; CPU) or the like (i) reads out a program stored in a non-volatile memory (storage section 106) realized by a read only memory (ROM), a non-volatile random access memory (NVRAM), or the like into a main memory realized by RAM or the like and (ii) executes the program. The following description will discuss functional blocks in the control circuit 10.

(Details of Functional Blocks Other than Storage Section)

The control circuit 10 calculates a command voltage Vout which is a voltage to be supplied (i.e., applied) from the inverter circuit 60 to the servomotor 2. The control circuit 10 then generates a PWM signal for controlling the inverter circuit 60 to output the command voltage Vout. The control circuit 10 then supplies the generated PWM signal to the inverter circuit 60, and thus causes the inverter circuit 60 to output the command voltage Vout. Moreover, the control circuit 10 notifies the step-down converter circuit 40 of a voltage correction value Va. This causes the step-down converter circuit 40 to drop the DC voltage Vpn supplied from the rectifier circuit 30 by the voltage correction value Va and to apply the stepped-down DC voltage V'pn to the inverter circuit 60.

The speed command accepting section 101 obtains a speed command from, for example, the host controller, the tool, or the like (not illustrated), and notifies the current command generating section 102 of the obtained speed command.

The current command generating section 102 generates a current command Tout for commanding an electric current which is to flow through the servomotor 2. Here, the current command Tout is generated using a speed command accepted by the speed command accepting section 101 and a motor position (feedback value) of the servomotor 2 detected by the encoder 3. The current command generating section 102 generates, as the current command Tout, for example, phase current command values Icu, Icv, and Icw for commanding electric currents which are to flow through the respective phases of the servomotor 2. The current command generating section 102 notifies the output voltage calculating section 103 of the generated current command Tout (i.e., the phase current command values Icu, Icv, and Icw).

The output voltage calculating section 103 accepts the current command Tout (i.e., the phase current command values Icu, Icv, and Icw) generated by the current command generating section 102 and the current value (i.e., the detection phase current values Iu, Iv, and Iw) detected by the current detection circuit 70. The output voltage calculating section 103 generates a command voltage Vout, which is a voltage to be supplied from the inverter circuit 60 to the servomotor 2, with use of the phase current command values Icu, Icv, and Icw and the detection phase current values Iu, Iv, and Iw which have been accepted.

The output voltage calculating section 103 calculates, for example, phase voltage command values Vcu, Vcv, and Vcw (i.e., voltages to be applied to the respective phases of the servomotor 2) as the command voltage Vout with use of the phase current command values Icu, Icv, and Icw and the detection phase current values Iu, Iv, and Iw. Specifically, the output voltage calculating section 103 compares the detection phase current value with the phase current command value to calculate a deviation between those values. The output voltage calculating section 103 then calculates the phase voltage command values Vcu, Vcv, and Vcw such that the deviation becomes zero, i.e., the detection phase current value becomes equal to the phase current command value. The output voltage calculating section 103 notifies the step-down value calculating section 104 and the PWM signal generating section 105 of the calculated command voltage Vout (i.e., the phase voltage command values Vcu, Vcv, and Vcw).

The step-down value calculating section 104, which has been notified of the command voltage Vout (i.e., the phase voltage command values Vcu, Vcv, and Vcw) from the output voltage calculating section 103, refers to a voltage correction value table 1061 in the storage section 106, and obtains a voltage correction value Va for each command voltages Vout. The step-down value calculating section 104 notifies the step-down converter circuit 40 of the obtained voltage correction value Va. The step-down converter circuit 40, which has been notified of the voltage correction value Va from the step-down value calculating section 104, supplies (applies) a DC voltage V'pn (=Vpn−Va) to the inverter circuit 60. Here, the DC voltage V'pn is a voltage obtained by stepping down, by the voltage correction value Va, the DC voltage Vpn applied from the rectifier circuit 30. Alternatively, it is possible to employ a configuration as follows: that is, the step-down value calculating section 104, which has been notified of the command voltage Vout from the output voltage calculating section 103, calculates "a voltage correction value Va for each command voltage Vout" based on the command voltage Vout, and then the step-down value calculating section 104 notifies the step-down converter circuit 40 of the calculated voltage correction value Va. Alternatively, it is possible to employ a configuration in which the step-down value calculating section 104 directly controls the output voltage V'pn of the step-down converter circuit 40.

The PWM signal generating section 105 generates a PWM signal for (i) causing the inverter circuit 60 to convert "a DC voltage V'pn detected by the voltage detection circuit 50 (i.e., a DC voltage to be applied to the inverter circuit 60)" into "a command voltage Vout calculated by the output voltage calculating section 103" and (ii) causing the inverter circuit 60 to output the command voltage Vout. The PWM signal generating section 105 supplies the generated PWM signal to each of the switching elements of the inverter circuit 60.

Specifically, the PWM signal generating section 105 generates a PWM signal as follows, based on "a DC voltage V'pn detected by the voltage detection circuit 50" and "a command voltage Vout (i.e., phase voltage command values Vcu, Vcv, and Vcw) calculated by the output voltage calculating section 103".

First, the PWM signal generating section 105 generates "a duty indication value for controlling switching of each of the switching elements in the inverter circuit 60" for converting "the DC voltage V'pn detected by the voltage detection circuit 50" into "the voltage command values Vcu, Vcv, and Vcw". For example, the PWM signal generating section 105 generates duty indication values Dcuh, Dcvh, Dcwh, Dcul, Dcvl, and Dcwl for controlling switching of the respective switching elements (Quh, Qvh, Qwh, Qul, Qvl, and Qwl) in the inverter circuit 60.

Based on the duty indication values Dcuh, Dcvh, Dcwh, Dcul, Dcvl, and Dcwl, the PWM signal generating section 105 generates PWM signals for rotationally driving the servomotor 2 and supplies the generated PWM signals to the inverter circuit 60. Specifically, the PWM signal generating section 105 generates PWM signals to be supplied to the respective switching elements based on a carrier signal ("carrier wave for generating PWM" in FIGS. 6 and 7) and on each of the duty indication values Dcuh, Dcvh, Dcwh, Dcul, Dcvl, and Dcwl.

The PWM signal generating section 105 supplies the PWM signals, which have been generated based on the duty indication values Dcuh, Dcvh, Dcwh, Dcul, Dcvl, and Dcwl to the respective switching elements of the inverter circuit 60. Each of the switching elements (Quh/Qvh/Qwh/Qul/Qvl/Qwl) of the inverter circuit 60 carries out an ON/OFF operation in accordance with Dcuh/Dcvh/Dcwh/Dcul/Dcvl/Dcwl of the PWM signal, and applies a command voltage Vout to the servomotor 2. That is, the PWM signals are respectively supplied to the higher potential switching elements Quh, Qvh, and Qwh and the lower potential switching elements Qul, Qvl, and Qwl, and the inverter circuit 60 converts the DC voltage supplied from the step-down converter circuit 40 into the command voltage Vout and supplies the command voltage Vout to the servomotor 2.

Here, a duty Ton of the PWM signal generated by the PWM signal generating section 105 is longer than a dead time Td. That is, a period of ON or a duration of ON of the PWM signal generated by the PWM signal generating section 105 based on each of the duty indication values Dcuh, Dcvh, Dcwh, Dcul, Dcvl, and Dcwl are longer than the dead time Td. In other words, the duty Ton of the PWM signal which is supplied to the inverter circuit 60 in order for the inverter circuit 60 to convert "the voltage V'pn supplied from the step-down converter circuit 40 to the inverter circuit 60" into "the command voltage Vout" is greater than the dead time Td. The step-down converter circuit 40 steps down the voltage Vpn to V'pn, and this allows the PWM signal generating section 105 to cause the inverter circuit 60 to convert the voltage V'pn into the command voltage Vout with use of the PWM signal in which the duty Ton is greater than the dead time Td.

(Details of Storage Section)

The storage section 106 is a storage device for storing various kinds of data (for example, programs and various parameters which are set and adjusted by the tool and are necessary for operations of the servo driver 1) used by the servo driver 1 (in particular, the control circuit 10). The storage section 106 can non-transitorily store (i) a control program executed by the servo driver 1, (ii) an application program for executing various functions of the servo driver 1, and (iii) various kinds of data to be read out when the application program is executed. The storage section 106 further stores the voltage correction value table 1061.

In the voltage correction value table 1061, voltage correction values Va are stored while being associated with command voltages Vout. That is, a voltage correction value Va for each command voltage Vout is stored in the voltage correction value table 1061. The following description will discuss details of the voltage correction values Va stored in the voltage correction value table 1061 with reference to FIG. 3 and the like.

(Details of Voltage Correction Value)

(Influence of Dead Time)

FIG. 6 is a diagram for explaining an influence of a dead time Td on voltage control. FIG. 7 is another diagram (other than FIG. 6) for explaining an influence of a dead time Td on voltage control. Specifically, FIG. 6 exemplifies a case in which an ON time (duty Ton) of "a low side PWM (i.e., a PWM signal given to the low-side switching element)" is shorter (smaller) than the dead time Td. FIG. 7 exemplifies a case in which an ON time (duty Ton) of "a high side PWM (i.e., a PWM signal given to the high-side switching element)" is shorter (smaller) than the dead time Td.

Note that, in FIGS. 6 and 7, "voltage command value for motor driving" refers to a command voltage Vout. For the PWM signal, a PWM period is indicated as "T", an ON time (duty) is indicated as "Ton", and an OFF time is indicated as "Toff (=T−Ton)".

In a case where the step-down converter circuit 40 supplies the DC voltage Vpn received from the rectifier circuit 30 to the inverter circuit 60 without stepping down the DC voltage Vpn, the voltage (applied voltage Vm) applied to the servomotor 2 by the inverter circuit 60 that has accepted the PWM signal generally satisfies "Vm=Vpn×Ton/T".

Note that, as suggested in FIG. 6 and FIG. 7, both the high-side switching element and the low-side switching element are turned off during the dead time Td. Therefore, an output voltage is not determined, and the inverter circuit 60 cannot output the original voltage (command voltage Vout) due to an influence of the dead time Td. In other words, in a case where "Td≥Ton" is satisfied, the applied voltage Vm does not satisfy "Vm=Vpn×Ton/T". Therefore, the inverter circuit 60 cannot control the applied voltage Vm to be equal to the command voltage Vout.

(Control of Voltage Applied to Inverter Circuit by Step-Down Converter Circuit)

Under the circumstances, the servo driver 1 (in particular, the control circuit 10) adjusts a duty Ton of a PWM signal supplied to the inverter circuit 60 so that "Td<Ton" is satisfied to allow the inverter circuit 60 to control the applied voltage Vm.

Here, as described above, "Vm=Vpn×Ton/T" is satisfied. Therefore, in a case where Vm is constant, the duty Ton can be set to be larger (longer) than the dead time Td by lowering Vpn, i.e., the voltage supplied (applied) to the inverter circuit 60.

Thus, the control circuit 10 controls the step-down converter circuit 40 to drop the DC voltage Vpn supplied from the rectifier circuit 30 to V'pn, and to supply (apply) the stepped-down voltage V'pn to the inverter circuit 60. The step-down converter circuit 40 supplies (applies) the DC voltage V'pn, which has been stepped down, to the inverter circuit 60. This allows the control circuit 10 to adjust the duty Ton of the PWM signal supplied to the inverter circuit 60 so that "Td<Ton" is satisfied. In a case where the inverter circuit 60 has been supplied with the PWM signal in which the duty Ton satisfies "Td<Ton", the inverter circuit 60 can control the applied voltage Vm to be equal to the command voltage Vout. That is, the inverter circuit 60 can output the command voltage Vout by converting the DC voltage V'pn.

That is, in a case where the servo driver 1 provides an applied voltage Vm satisfying "applied voltage Vm=command voltage Vout", the servo driver 1 increases Ton by adjusting V'pn, specifically, by decreasing (stepping down) V'pn, because "Vm=V'pn×Ton/T" is satisfied. Specifically, in the servo driver 1, the step-down converter circuit 40 supplies (applies), to the inverter circuit 60, a DC voltage V'pn which has been obtained by stepping down the DC voltage Vpn by the voltage correction value Va notified from the control circuit 10 (in particular, the step-down value calculating section 104). From this, the control circuit 10 supplies, to the inverter circuit 60, the PWM signal having the duty Ton which is greater than the dead time Td. Thus, the control circuit 10 controls the voltage, which is to be applied to the servomotor 2 from the inverter circuit 60, to the "command voltage Vout".

(Example of Method for Calculating Voltage Correction Value for Step-Down Converter Circuit)

As above described, both the high-side switching element and the low-side switching element are turned off during the dead time Td. Therefore, the voltage (applied voltage Vm) applied from the inverter circuit 60 to the servomotor 2 changes in accordance with the direction of the electric current flowing between the inverter circuit 60 and the servomotor 2. From this, the inverter circuit 60 cannot control the applied voltage Vm. Here, the applied voltage Vm can be generally represented as "Vm=V'pn×Ton/T" and the inverter circuit 60 is configured to control the applied voltage Vm to be equal to the command voltage Vout. Therefore, "Td≥Ton" can be expressed as follows. That is, "Td≥Ton" can be expressed as "Vpn×Td/T≥Vout". That is, in a case where the output voltage supplied from the inverter circuit 60 to the servomotor 2 (i.e., the command voltage Vout) satisfies "Vpn×Td/T≥Vout", the inverter circuit 60 cannot output the command voltage Vout due to the dead time Td.

Under the circumstances, the step-down value calculating section 104 compares the command voltage Vout notified from the output voltage calculating section 103 with a threshold voltage Vth which is represented as "Vth=Vpn× Td/T×n (n is an adjusting value)", and executes the following process.

In a case where "command voltage Vout>threshold voltage Vth" is satisfied, the step-down value calculating section 104 notifies the step-down converter circuit 40 that "there is no need to step down the DC voltage Vpn supplied from the rectifier circuit 30". Alternatively, the step-down value calculating section 104 notifies that "the voltage correction value Va=0". The step-down converter circuit 40 notified by the step-down value calculating section 104 that "there is no need to step down the DC voltage Vpn supplied from the rectifier circuit 30" or "the voltage correction value Va=0" applies "the DC voltage Vpn supplied from the rectifier circuit 30" to the inverter circuit 60 without stepping down the DC voltage Vpn. That is, the step-down converter circuit 40 applies the DC voltage V'pn (=Vpn) to the inverter circuit 60.

In a case where "threshold voltage Vth command voltage Vout" is satisfied, the step-down value calculating section 104 refers to the voltage correction value table 1061 in the storage section 106, and obtains a voltage correction value Va for each command voltage Vout. The step-down value calculating section 104 notifies the step-down converter circuit 40 of the obtained voltage correction value Va. The step-down converter circuit 40, which has been notified of the voltage correction value Va from the step-down value calculating section 104, converts the DC voltage Vpn applied from the rectifier circuit 30 into the DC voltage V'pn (=Vpn−Va) by stepping down the DC voltage Vpn by the voltage correction value Va. Then, the step-down converter circuit 40 applies the DC voltage V'pn (=Vpn−Va) to the inverter circuit 60.

Figure 3:
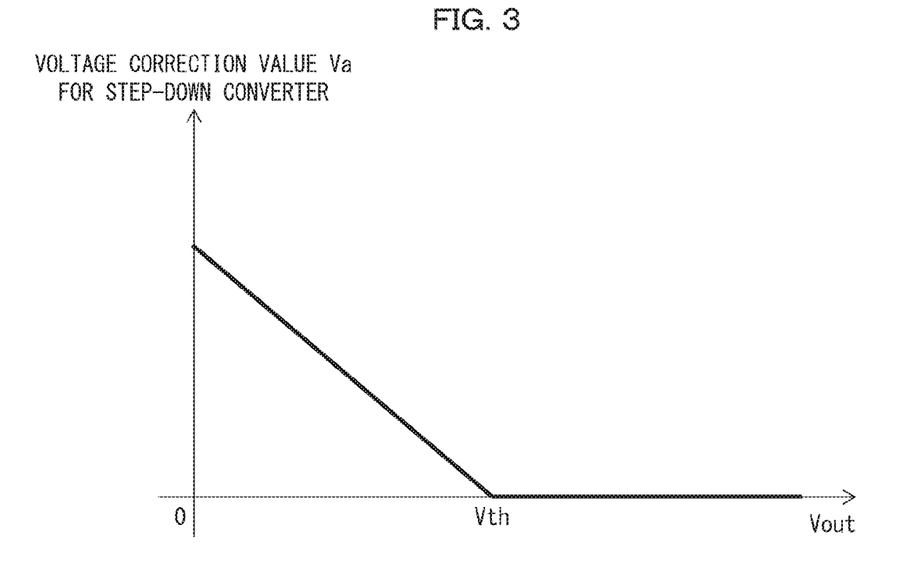
FIG. 3 is a diagram illustrating an example of a voltage correction value table stored in a storage section of the servo driver in accordance with Embodiment 1 of the present invention.

The voltage correction value Va is, for example, calculated for each command voltage Vout in advance and stored in the voltage correction value table 1061 such that the DC voltage V'pn (=Vpn−Va) satisfies "V'pn×Ton/T=Vout" by Ton satisfying "Td<Ton".

FIG. 3 is a diagram illustrating an example of the voltage correction value table 1061 stored in the storage section 106 of the servo driver 1. In the examples illustrated in FIG. 3, the voltage correction value table 1061 is represented by a function indicating a correspondence between the voltage correction value Va and the command voltage Vout. In the voltage correction value table 1061 illustrated in FIG. 3, the voltage correction value Va decreases as the command voltage Vout increases within the range of "threshold voltage Vth≥command voltage Vout". In addition, in the range of "command voltage Vout>threshold voltage Vth", "Va=0" is satisfied. That is, as illustrated in FIG. 3, in a case where an X-axis is set to "command voltage Vout" and a Y-axis is set to "voltage correction value Va", the voltage correction value table 1061 is a downward-sloping graph in the range of "threshold voltage Vth command voltage Vout". In addition, in the range of "command voltage Vout>threshold voltage Vth", Va is represented by a straight line of "Va=0". For example, in the range of "threshold voltage Vth command voltage Vout", the "voltage correction value Va" can be defined as "Va=Vpn−Vout×T/T'on" by the command voltage Vout and T'on satisfying "Td<T'on". The voltage correction value Va can be defined as "Va=0" in the range of "Vout>Vth".

Note that, the voltage correction value table 1061 is not limited to the function shown in FIG. 3. It is not essential that the "voltage correction value Va" is defined as a linear function of the "command voltage Vout" whose slope is negative, and can be any value that can be determined for each command voltage Vout. The voltage correction value Va can be set so that the DC voltage V'pn (=Vpn−Va) becomes "V'pn×Ton/T=Vout" by Ton satisfying "Td<Ton".

As described above, it is not essential for the step-down value calculating section 104 to refer to the voltage correction value table 1061 so as to obtain the voltage correction value Va associated with the command voltage Vout. It is possible to employ a configuration as follows: that is, in a case where the step-down value calculating section 104 has been notified of the command voltage Vout, the step-down value calculating section 104 calculates a voltage correction value Va based on the command voltage Vout using a predetermined calculation formula (e.g., the function as illustrated in FIG. 3) and outputs the calculated voltage correction value Va. That is, in a case where the output voltage calculating section 103 has notified the step-down value calculating section 104 of the command voltage Vout and "threshold voltage Vth≥command voltage Vout" is satisfied, the step-down value calculating section 104 can calculate a voltage correction value Va based on "Va=Vpn−Vout×T/T'on". In a case where "Vout>Vth" is satisfied, the step-down value calculating section 104 can calculate the voltage correction value Va as "Va=0".

§ 3. Operation Example

The output voltage calculating section 103 of the control circuit 10 calculates a command voltage Vout (for example, phase voltage command values Vcu, Vcv, and Vcw which are voltages to be applied to respective phases of the servomotor 2) which is a voltage to be supplied from the inverter circuit 60 to the servomotor 2. The output voltage calculating section 103 notifies the step-down value calculating section 104 and the PWM signal generating section 105 of the calculated command voltage Vout (i.e., the phase voltage command values Vcu, Vcv, and Vcw).

The step-down value calculating section 104, which has been notified of the command voltage Vout from the output voltage calculating section 103, refers to the voltage correction value table 1061 in the storage section 106, and obtains a voltage correction value Va for each command voltage Vout. The step-down value calculating section 104 notifies the step-down converter circuit 40 of the obtained voltage correction value Va. Alternatively, it is possible to employ a configuration as follows: that is, the step-down value calculating section 104, which has been notified of the command voltage Vout from the output voltage calculating section 103, calculates "a voltage correction value Va for each command voltage Vout" based on the command voltage Vout, and then the step-down value calculating section 104 notifies the step-down converter circuit 40 of the calculated voltage correction value Va.

The step-down converter circuit 40, which has been notified of the voltage correction value Va from the step-down value calculating section 104, converts the DC voltage Vpn applied from the rectifier circuit 30 into the DC voltage V'pn (=Vpn−Va) by stepping down the DC voltage Vpn by the voltage correction value Va. Then, the step-down converter circuit 40 supplies (applies) the DC voltage V'pn (=Vpn−Va) to the inverter circuit 60. Alternatively, as described above, it is possible to employ a configuration in which the step-down value calculating section 104 directly controls the output voltage V'pn of the step-down converter circuit 40.

The PWM signal generating section 105 generates a PWM signal that "causes the inverter circuit 60 to convert a DC voltage V'pn into a command voltage Vout (i.e., phase voltage command values Vcu, Vcv, and Vcw)". The PWM signal generating section 105 then supplies the generated PWM signal to each of the switching elements of the inverter circuit 60. In particular, the PWM signal generating section 105 generates a PWM signal having a duty Ton (specifically, a period of ON or a duration of ON of the PWM signal, corresponding to each of the duty indication values Dcuh, Dcvh, Dcwh, Dcul, Dcvl, and Dcwl) which is longer than a dead time Td.

The inverter circuit 60 supplies (applies), to the servomotor 2, a "command voltage Vout (i.e., phase voltage command values Vcu, Vcv, and Vcw) which has been obtained by converting the DC voltage V'pn with use of the PWM signal supplied from the control circuit 10".

Here, the duty Ton of the PWM signal supplied to the inverter circuit 60 (in particular, to each switching element) is greater than the dead time Td. Therefore, the inverter circuit 60 can supply (apply) a desired voltage (command voltage Vout) to the servomotor 2 in accordance with a command from the control circuit 10, i.e., in accordance with the PWM signal without being subjected to an influence by the dead time. Therefore, the servo driver 1 can cause the servomotor 2 to carry out the desired driving without being subjected to an influence by the dead time Td.

That is, the step-down value calculating section 104 supplies the voltage correction value Va to the step-down converter circuit 40 so that "the inverter circuit 60 can convert the DC voltage V'pn into the command voltage Vout by the PWM signal in which the duty Ton satisfies "Ton>Td". Specifically, the step-down value calculating section 104 notifies the step-down converter circuit 40 of the voltage correction value Va and thus causes the step-down converter circuit 40 to supply (apply), to the inverter circuit 60, a DC voltage V'pn obtained by "dropping, by the voltage correction value Va, the DC voltage Vpn supplied from the rectifier circuit 30".

The step-down value calculating section 104 which has been notified of the voltage correction value Va from the step-down value calculating section 104 applies, to the inverter circuit 60, the DC voltage V'pn which has been obtained by dropping, by the voltage correction value Va, the DC voltage Vpn supplied from the rectifier circuit 30.

The voltage applied to the inverter circuit 60 is stepped down from Vpn to V'pn. From this, the control circuit 10 can make the duty Ton of the PWM signal, which is a signal for causing the inverter circuit 60 to output the command voltage Vout, greater (longer) than the dead time Td. The control circuit 10 supplies, to the inverter circuit 60 (in particular, each switching element in the inverter circuit 60), the PWM signal having the duty Ton which is greater than the dead time Td.

The inverter circuit 60 turns ON and OFF each of the switching elements in accordance with the PWM signal. Thus, the inverter circuit 60 converts the DC voltage V'pn, which has been supplied from the step-down converter circuit 40, into the command voltage Vout (i.e., phase voltage command values Vcu, Vcv, and Vcw) and then applies (supplies) the command voltage Vout to the servomotor 2.

§ 4. Modification Example

In the embodiment described above, the servo driver has been described as the motor control device in accordance with the present invention. However, the motor control device in accordance with an aspect of the present invention does not essentially need to be a servo driver. The present invention can also be applied to a configuration in which an inverter is used as the motor control device in accordance with an aspect of the present invention. The servo driver 1 can be an AC servomotor driver or a DC brushless motor driver.

In the embodiment described above, as an example, the servo driver 1 controls the servomotor 2 based on a motor position supplied from the encoder 3. However, it is not essential for the servo driver 1 to use the motor position to control the driving of the servomotor 2. It is possible that, for example, a torque sensor for detecting a torque of the servomotor 2 is provided instead of the encoder 3, and the servo driver 1 controls the servomotor 2 on the basis of a torque value provided from the torque sensor. Alternatively, it is possible that, for example, a speed sensor for detecting a speed of the servomotor 2 is provided instead of the encoder 3, and the servo driver 1 controls the servomotor 2 on the basis of a speed value provided from the speed sensor. Further, the servo driver 1 can be configured to estimate a motor position by the current detection circuit 70.

For the servo driver 1, it is not essential to include the voltage detection circuit 50. The servo driver 1 can control a voltage applied to the inverter circuit 60 by, for example, carrying out an open-loop control on the step-down converter circuit 40.

In the above descriptions, the example has been described in which the servo driver 1 detects an electric current flowing through the servomotor 2 and calculates, with use of the detected electric current, the command voltage Vout that indicates a voltage value of electric power to be supplied to the servomotor 2. However, it is not essential for the servo driver 1 to calculate the command voltage Vout with use of the electric current flowing through the servomotor 2. The servo driver 1 only needs to carry out the following operations: (i) detection of a predetermined physical quantity (e.g., an electric current flowing through the servomotor 2) in the servomotor 2, which is generated in association with driving of the servomotor 2; and (ii) calculation of a command voltage Vout with use of the detected physical quantity.

In the embodiment described above, as an example, the servomotor 2 is the three-phase motor. Note, however, that the servo driver 1 can be applied to control of a motor other than the three-phase motor. In a case where a multiphase motor is controlled, the servo driver 1 can include pairs of upper and lower arms corresponding to the number of phases in the inverter circuit 60. For example, in a case where a two-phase motor is to be controlled, the number of PWM signals can be four. Similarly, the servo driver 1 can be applied to a control device for a multiphase motor having four or more phases.

In the embodiment described above, the switching element of the inverter circuit 60 can be, for example, FET. Alternatively, it is possible to employ another switching element such as an insulated-gate bipolar-mode transistor (IGBT).

The motor whose driving is to be controlled by the servo driver 1 is not limited to the servomotor 2, and the servo driver 1 can also be applied to controlling of a motor such as a stepping motor (brushless motor). The servo driver 1 can also be used to control an AC driven motor such as an AC-induced motor or an SR motor.

It is not essential for the servo driver 1 to include the three-phase AC power source 20 and the rectifier circuit 30. The servo driver 1 can be supplied with DC power (direct current power source) as electric power for a main circuit (i.e., as electric power supplied to the inverter circuit 60).

The servo driver 1 only needs to be configured such that the step-down converter circuit 40 can step down a voltage applied to the inverter circuit 60 so that "the duty Ton of the PWM signal for controlling "the voltage supplied from the inverter circuit 60 to the servomotor 2" becomes greater than the dead time Td". It is not essential that the servo driver 1 "includes the three-phase AC power source 20 as the main circuit power source and rectifies, by the rectifier circuit 30, electric power outputted from the three-phase AC power source 20 and supplies the electric power to the inverter circuit 60". The servo driver 1 can include, as a main circuit power source, a direct current power source.

In the above descriptions, the example has been described in which the servo driver 1 includes the step-down converter circuit 40, and the step-down converter circuit 40 controls a voltage (DC voltage V'pn) applied to the inverter circuit 60. However, it is not essential for the servo driver 1 to include the step-down converter circuit 40. The servo driver 1 only needs to be able to control the voltage (DC voltage V'pn) applied to the inverter circuit 60 such that the duty Ton of the PWM signal becomes greater than the dead time Td which is predetermined to prevent short circuit caused due to the switching elements in the inverter circuit 60. For example, it is possible that the servo driver 1 includes a step-up inverter circuit and causes the step-up inverter circuit to switch a voltage to be applied to the inverter circuit 60 depending on whether or not the command voltage Vout is equal to or lower than the threshold voltage Vth. Specifically, the servo driver 1 can carry out the following control: (i) In a case where the command voltage Vout is greater than the threshold voltage Vth, the step-up converter circuit is controlled to apply a voltage Vord (normal voltage) to the inverter circuit 60; (ii) In a case where the command voltage Vout is equal to or lower than the threshold voltage Vth, the step-up inverter circuit is controlled to apply, to the inverter circuit 60, a voltage which has been obtained by stepping down the voltage Vord in accordance with the command voltage Vout. Alternatively, the servo driver 1 can control a voltage (DC voltage V'pn) applied to the inverter circuit 60 by any known configuration which can control a voltage and is different from the converter circuit.

Moreover, as above described, it is not essential for the servo driver 1 to employ the PWM modulation. The servo driver 1 can employ modulation carried out with an SV-PWM method.

Aspects of the present invention can also be expressed as follows:

The motor control device in accordance with an aspect of the present invention includes: an inverter circuit which drives a motor based on ON and OFF states of each of switching elements, the ON and OFF states being switched by a pulse width modulation (PWM) signal; and a control circuit which is connected to the inverter circuit via a signal line, the control circuit supplying the PWM signal to the inverter circuit, the control circuit controlling a voltage to be applied to the inverter circuit such that a duty of the PWM signal becomes greater than a dead time which is predetermined for preventing short circuit caused due to the switching elements.

According to the configuration, the motor control device controls a voltage to be applied to the inverter circuit such that a duty of the PWM signal becomes greater (longer) than the dead time.

Here, in a case where a voltage to be supplied from the inverter circuit to the motor is constant, the duty of the PWM signal can be controlled by controlling a DC voltage applied to the inverter circuit. That is, the motor control device controls the DC voltage to be applied to the inverter circuit. From this, the motor control device controls the duty of the PWM signal independently from the switching characteristic of the switching element, and thus can inhibit an influence by the dead time on the PWM signal.

Therefore, the motor control device brings about an effect of easily inhibiting an influence of a dead time on voltage control without requiring a user to consider a specific usage condition or the like of each motor control device.

The motor control device in accordance with an aspect of the present invention can further include: a step-down converter circuit which is connected to the control circuit via a signal line and is connected to the inverter circuit via a power feed line, the step-down converter circuit applying a DC voltage to the inverter circuit, the control circuit (i) calculating a command voltage which is a voltage to be applied from the inverter circuit to the motor and (ii) controlling the step-down converter circuit to step down, in accordance with the command voltage, the voltage to be applied to the inverter circuit.

According to the configuration, the motor control device includes the step-down converter circuit for applying a DC voltage to the inverter circuit. The motor control device calculates a command voltage which is a voltage to be applied to the motor, and causes the step-down converter circuit to step down, in accordance with the calculated command voltage, the voltage to be applied to the inverter circuit.

Here, in a case where the voltage applied to the inverter circuit is constant, the duty of the PWM signal decreases as the command voltage becomes lower. That is, the duty of the PWM signal is proportional to the command voltage.

Moreover, in a case where the command voltage which is a voltage to be supplied from the inverter circuit to the motor is constant, the duty of the PWM signal can be set to be greater (longer) by stepping down a DC voltage applied to the inverter circuit.

That is, the motor control device controls the step-down converter circuit to step down, in accordance with the command voltage, the voltage to be applied to the inverter circuit. From this, the motor control device can set the duty of the PWM signal to be greater (longer) than the dead time.

As such, the motor control device brings about an effect of easily inhibiting, with the step-down converter circuit, an influence of a dead time on voltage control without requiring a user to consider a specific usage condition or the like of each motor control device.

According to the motor control device in accordance with an aspect of the present invention, it is possible that, in a case where the command voltage is equal to or lower than a predetermined value, the control circuit controls the step-down converter circuit to step down, in accordance with the command voltage, the voltage to be applied to the inverter circuit.

According to the configuration, the motor control device steps down the voltage to be applied to the inverter circuit in a case where the command voltage is equal to or lower than the predetermined value.

As above described, in a case where the voltage applied to the inverter circuit is constant, the duty of the PWM signal decreases as the command voltage becomes lower. That is, in a case where the voltage applied to the inverter circuit is constant and the command voltage is equal to or lower than the predetermined value, the duty of the PWM signal becomes equal to or shorter than the dead time.

In view of this, in a case where the command voltage is not higher than the predetermined value, the motor control device controls the step-down converter circuit to step down, in accordance with the command voltage, the voltage to be applied to the inverter circuit, in order to prevent the duty of the PWM signal from becoming equal to or shorter than the dead time.

In a case where the command voltage is equal to or lower than the predetermined value and the dead time can influence voltage control, the motor control device steps down the voltage to be applied to the inverter circuit and can thus inhibit the influence.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Servo driver
2: Servomotor
10: Control circuit
40: Step-down converter circuit
60: Inverter circuit
Td: Dead time
Ton: Duty
Vth: Threshold voltage (predetermined value)
Vout: Command voltage

The invention claimed is:

1. A motor control device comprising:
an inverter circuit which drives a motor based on ON and OFF states of each of switching elements, the ON and OFF states being switched by a pulse width modulation (PWM) signal;
a control circuit which is connected to the inverter circuit via a signal line, the control circuit supplying the PWM signal to the inverter circuit; and
a step-down converter circuit which is connected to the control circuit via a signal line and is connected to the inverter circuit via a power feed line, the step-down converter circuit applying a DC voltage to the inverter circuit,
the control circuit controlling a voltage to be applied to the inverter circuit such that a duty of the PWM signal becomes greater than a dead time which is predetermined for preventing short circuit caused due to the switching elements,
the control circuit (i) calculating a command voltage which is a voltage to be applied from the inverter circuit to the motor and (ii) controlling the step-down converter circuit to step down, in accordance with the command voltage, the voltage to be applied to the inverter circuit.

2. The motor control device as set forth in claim 1, wherein:
in a case where the command voltage is equal to or lower than a predetermined value, the control circuit controls the step-down converter circuit to step down, in accordance with the command voltage, the voltage to be applied to the inverter circuit.

* * * * *